April 7, 1936.  J. L. ANDERSON  2,036,673
MANUFACTURE OF FUSION WELDED PIPE
Filed Jan. 8, 1930  3 Sheets-Sheet 1
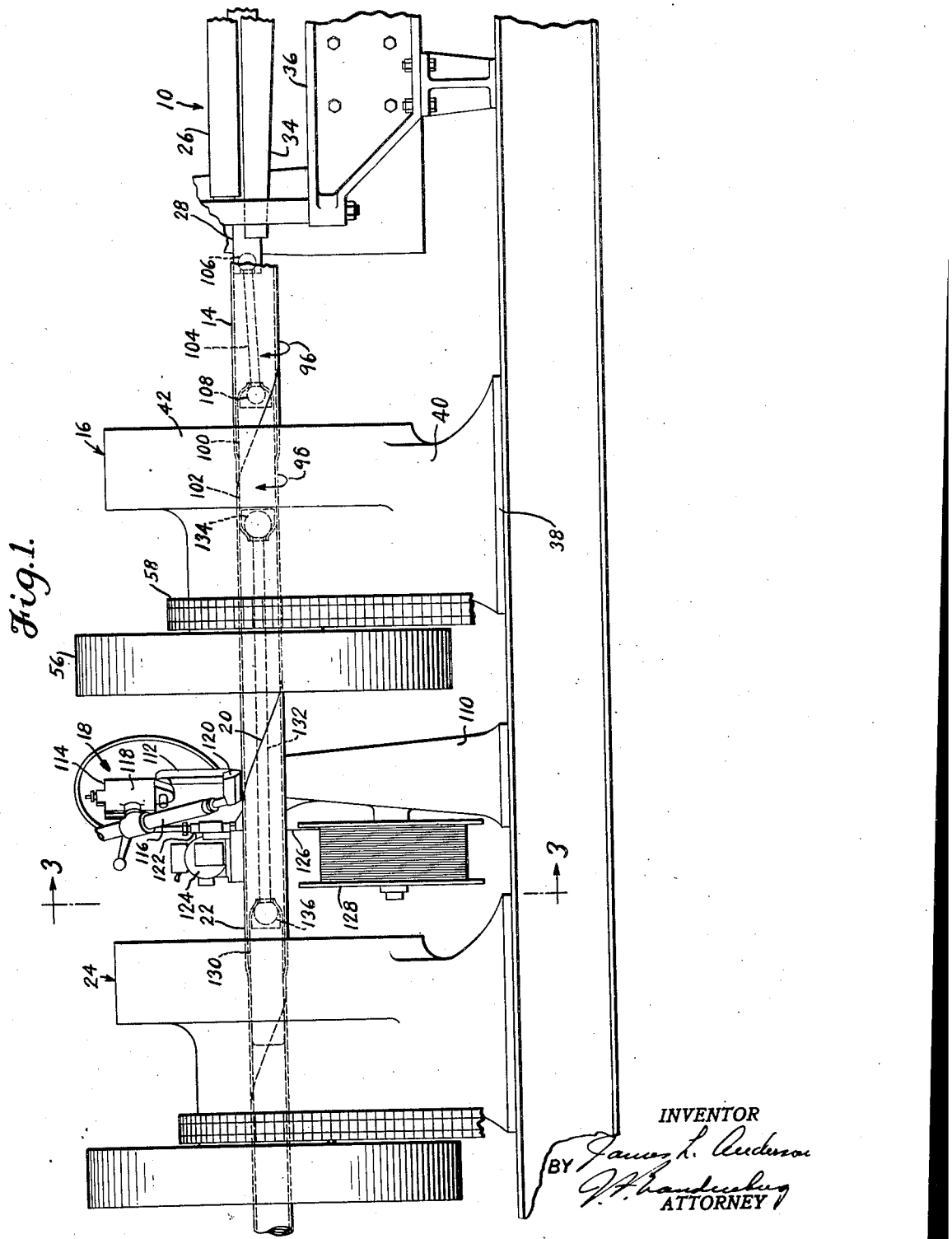
INVENTOR
James L. Anderson
BY
ATTORNEY

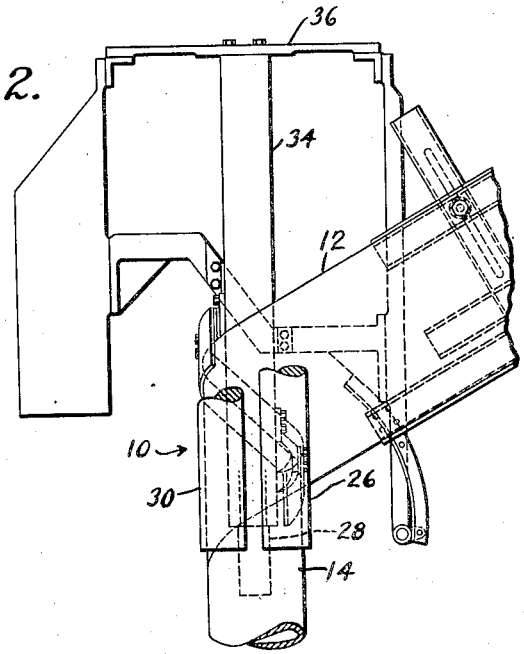
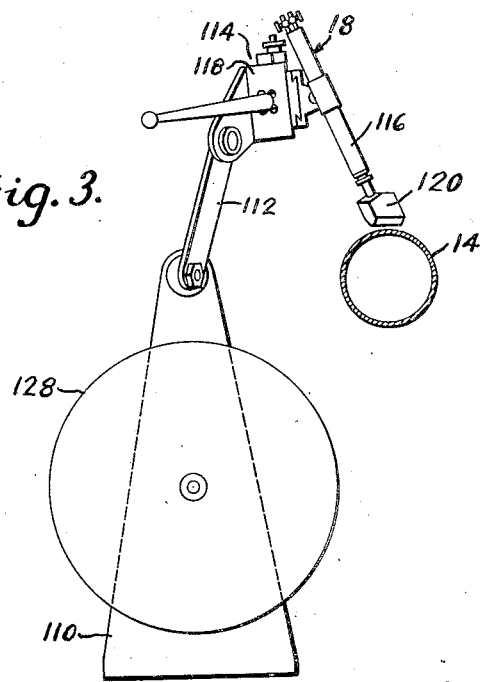

April 7, 1936.  J. L. ANDERSON  2,036,673
MANUFACTURE OF FUSION WELDED PIPE
Filed Jan. 8, 1930  3 Sheets-Sheet 3
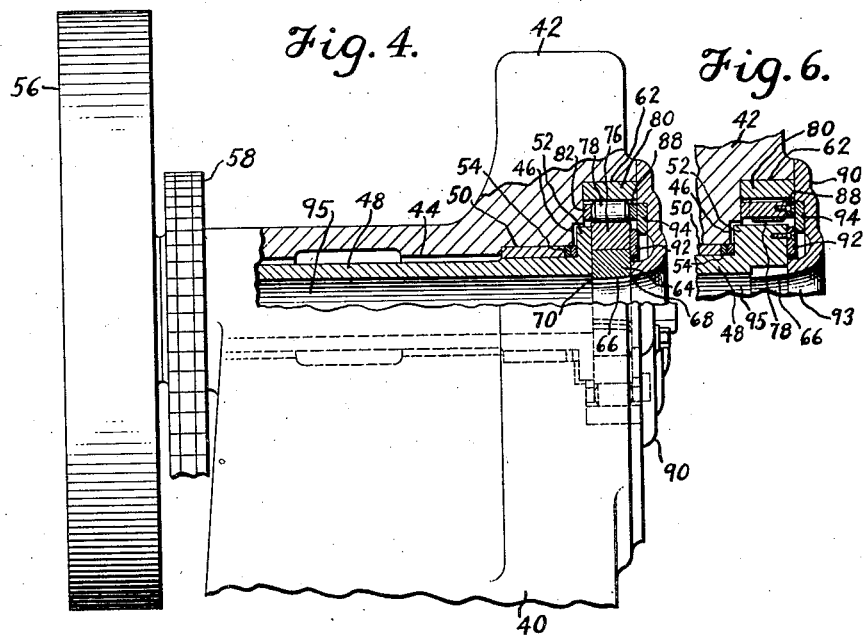
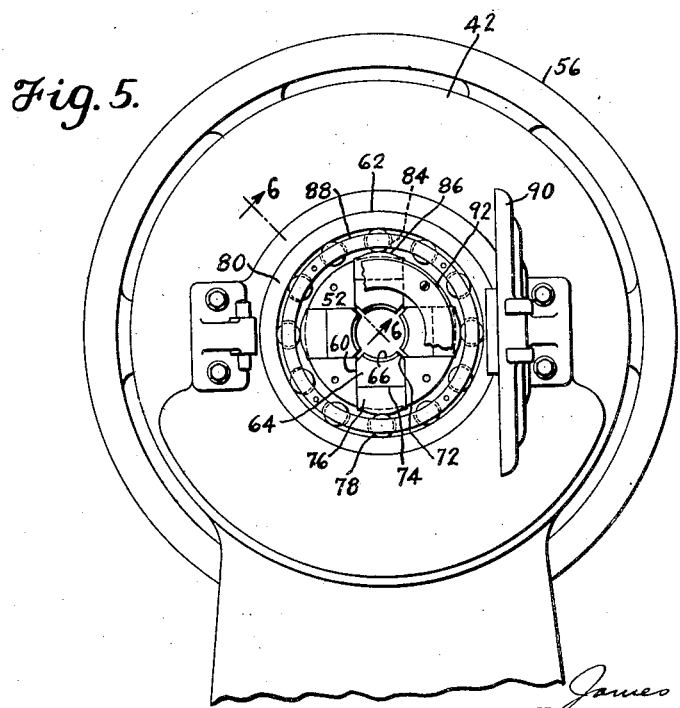

Patented Apr. 7, 1936

2,036,673

UNITED STATES PATENT OFFICE 2,036,673

MANUFACTURE OF FUSION WELDED PIPE

James L. Anderson, Tenafly, N. J., assignor to Air Reduction Company, Incorporated, New York, N. Y., a corporation of New York Application January 8, 1930, Serial No. 419,312

14 Claims. (Cl. 78—86)

This invention relates to the manufacture of welded pipe and tubing and more especially fusion welded pipe and tubing, and consists broadly in a continuous method and apparatus wherein flat metal is formed into tubular shape, the metal is then worked to set its edge portions in accurate relation, and these regions are then welded. The invention relates more particularly to butt-welded pipe, and especially to helical pipe.

The plan of rolling a sheet of metal into a helix, bringing the side edges into contact, and welding closed the helical seam to form pipe or tubing, is known.

The manufacture of fusion-welded pipe or tubing from helically wound strip has presented difficulty, particularly when relatively heavy-walled pipe is concerned. In general, the methods of manufacture have employed lap-welding operations rather than butt-welding. In the manufacture of fusion-welded helical pipe it has been deemed necessary to weld the seam closed immediately upon its formation and while the forces, necessary for the bending and forming operation, were still active in shaping the metal into the helical form and in holding the edges in position after they had been brought into abutment. In the forming operation the sheet metal was brought to a set of rolls at an angle to the latter; the rolls then sharply bent the metal to set the metal into a definite arcuate shape; the formed metal left the rolls and curled into a helix. In the absence of some restraining influence brought to bear upon the formed metal immediately upon assuming its definite shape, the edges of the helix, because of the elastic tendencies of the metal, would seek to move apart and resist proper welding. Such separation of the edges might be laterally of the pipe as well as longitudinally thereof. Therefore, the newly formed metal required some means effectively to fix its relation to the pipe finally to be delivered. For this reason, as the sheet was bent, the edge toward the helix was welded to the helical edge of the pipe immediately at the bending rolls, the edge of the helical pipe retaining its proper relation due to the rigidity of the previously welded seam.

In such an operation, this not only means that the welding operation must be performed within the space of a very few inches or not at all, but it also requires the welding together of the seam edges while they are affected by the great bending strain. Since the metal is still resisting deformation, when the edges are bonded by the welding process, the newly formed seam is subjected to great stresses, tending to tear it asunder. While the destruction of the seam may not result, its strength is materially reduced by the internal stresses. As the seam is welded closed before the action of the forming rolls has been completed, it necessarily follows that the newly formed seam is affected by forces inimical to the work just completed. Some attempt has been made to eliminate the necessity for locating the welding apparatus immediately at the point where the sheet metal is biased into its new shape, and thereby to remove the welding point to a position at a considerable distance from the forming machine. I am familiar with the use of a sleeve, receiving the helix as it is formed and guiding it to a welding machine located the distance of a convolution away from the forming apparatus. This has been unsatisfactory because of the inability to retain the bent sheet in edge to edge contact or opposition and the edges themselves in alignment. The seam, even if completely and successfully welded, was still affected by the great strain to which the metal had been subjected in the forming operation, which frequently reduced the strength of the metal at the seam greatly below that of the metal from which the pipe or tubing was being fabricated. Furthermore, the operations and the apparatus forming the sheet into a helix required extremely accurate governing and adjustment not only to insure the alignment and abutment of the bent metal edges, but also in order to secure pipe of a desired diameter. No previous attempt to remove the welding point to a position at a distance from the point at which the metal was formed, I believe, has eliminated this extreme requirement of accuracy.

In such methods of operation, there was present the danger that the helix under the great strain resulting from the deforming stress would, either before or after welding was completed, be unwrapped and the edges separated. The strain acting upon the metal of the freshly formed and probably but slightly solidified weld would in many cases tear apart the seam edges. Where the sleeve above spoken of was used, a frictional drag upon the unwelded formed metal tended to unwrap the helix, rather than to retain it in the formed condition.

It is, therefore, an object of this invention to provide a process in which sheet or plate metal is bent into helical form and thereafter the seam formed by the abutted or opposed edges of the bent sheet is welded closed to form pipe, tubing, or the like, and in which the welding operation is performed at a distance sufficiently removed from the forming apparatus to enable the welding apparatus to be conveniently located. The spacing of the welding and forming apparatus is such that the bent metal after leaving the forming machine will be able to assume a constant and fixed relation to other metal previously bent by the forming apparatus. In order to effect these desired results, the metal immediately after its release from the forming apparatus is subjected to mechanical working or forging action by which the natural tendency of the edges to curl or spring is effectively eliminated or reduced sufficiently for the welding operation to proceed thereafter at any desired distance away from the forming machine, the seam edges remaining in relation for welding without a further forming operation. The term "forging" or "forging action", as used in the specification, describes a working of the metal, by which it acquires a permanent set, and is not to be understood in its limited sense of hammering metal while hot.

It is an object of this invention to work the metal before the welding operation and thereby fix the bent sheet in the desired helical form with the edges thereof set in accurate abutment and alignment. The working or forging apparatus is so constructed that, simultaneously with the application of force to the bent metal in working it, another force will be effective by which the helically formed metal will be wrapped more accurately into the helical form, with the edges in properly abutted relation, and that, finally, the sheet, with the edges set in abutment or opposition to form a helical seam, will be brought to the welding apparatus. The working operation will be such as to deliver a helically formed sheet for producing a pipe of specifically uniform diameter, so that the flames or other welding means, at the welding point, will not require the critical adjustment at present necessary in order to obtain the proper heating and fusing of the metal at the seam.

In order to produce a stronger metallic crystalline structure along the seam, also to reduce the diameter of the finished pipe, and thereby produce accurate sizes, within suitable limits, and to cooperate with the working operation prior to welding, the pipe or tube may be worked after the welding operation.

In carrying out the invention, any suitable forming mill is used for bending the metal into the helical form. Immediately beyond the forming mill is positioned apparatus to receive the metallic helix, grip the metal at predetermined intervals to force the edges of the helical seam into proper relation while retaining the alignment thereof, and work the metal until it has been stressed sufficiently to set the edges in position. These operations are effected by means of a swaging machine, preferably having a plurality of vibrating dies, propelled against the pipe by the impact of associated hammers, rebounding from a set of substantially stationary rolls, fixed in a cage ring within which the hammers and the dies rapidly rotate. Thereby a number of sharp blows will be delivered to the metal of the helically formed tube. During the short time that the die and the tube are in contact, the dies grip the tube, and, by virtue of their continuous, rapid rotation, tend to move the metal with them in the direction of their rotation. By properly relating the direction of rotation of the dies and of the helically formed sheet as it travels away from the forming machine, the dies may be operated to move the bent metal more closely into helical form, that is, to move the edges outwardly into uniform alignment and abutment.

The number of revolutions and the consequent number of blows delivered will be regulated so that the work done upon the metal will correspond to that necessary to stress the metal beyond its elastic limit while in the bent condition. Sufficient work will be done upon the helically formed sheet to eliminate the elastic tendency to move out of and destroy the helical formation. If desired, a mandrel may be utilized in conjunction with the swaging machine. A mandrel not only assists in aligning the edges during the swaging operation, but also, by effectively limiting or even eliminating bending of the inner surface of the helically formed metal, confines the effect of the working to the outer surface of the sheet upon which the dies directly impact. Since only the outer surface of the sheet need be worked, sufficient stress can be applied to fix the edges in permanent relation to each other with a minimum amount of work.

The welding of the seam is effected by fusion, preferably by means of one or more oxyacetylene torches directing high temperature flames at or adjacent the helical seam edges to fuse them together, so that the seam forms an integral, uniform and substantial part of the tube itself.

In order to work the welded seam after the welding operation, another swaging machine may be set up immediately beyond the welding apparatus, to receive the welded tube, and hammer the entire tube to work the same. During this swaging operation, by proper adjustment, provision may be made for reducing the diameter of the welded pipe to any finally desired diameter. The operation of this swaging machine is preferably coordinated with the first machine in order to time the periods during which the seam at the welding machine might be affected by the twisting action of the gripping dies. When the dies of each machine are properly timed, gripping at the two machines will be alternately effective and the lateral movement of the seam at and relative to the welding apparatus can be averaged over a greater lineal movement of the seam and thereby its effect in displacing the seam relatively to the substantially fixedly located torch can be minimized.

By this method and apparatus it is possible to produce pipe from skelp which has been wrapped into a helix without the necessity of welding the bent edges together immediately as they are formed. Furthermore, the removal of strain from the fused seam during and after the welding operation practically eliminates danger from weak seams arising from the elastic tendencies in the deformed metal. While the use of oxyacetylene fusion devices are preferred, it is possible to utilize any apparatus, the result of which would be the welding together of the edges by their interfusion.

Other objects of this invention will appear from the specifications in which has been incorporated a description of an embodiment of apparatus for carrying out this process. On the drawings, in which appears a showing of the preferred apparatus for carrying out a process embodying the invention:

Fig. 1 is an elevational view of apparatus, provided to manufacture welded pipe, in accordance with the invention;

Fig. 2 is a detail plan view of a portion of the metal bending machine used in the apparatus of Fig. 1;

Fig. 3 is an elevational view of the welding apparatus as seen from line 3—3 of Fig. 1;

Fig. 4 is a front elevational view of a swaging machine, which may be used as a part of the apparatus shown in Fig. 1, portions being broken away to illustrate the internal construction thereof;

Fig. 5 is a side elevational view of said swaging machine, the door thereof being swung open to disclose the elements of the machine; and Fig. 6 is a detail sectional view on the line 6—6 of Fig. 5, illustrating the construction and assembly of the cage, spindle and associated parts.

On the drawings, there is diagrammatically represented at 10 a portion of the apparatus used to continuously bend a straight sheet or strip of plate or sheet metal 12 into a helix 14, which moves away from the apparatus at constant speed. From the bending machine the helix is fed to a forging means comprising a swaging machine 16, to be worked mechanically for the purpose of setting the bent sheet to retain a desired contour. The rigidly set metal then moves to the welding apparatus 18, where the seam 20 is welded closed to produce pipe the seams of which are a substantial integral part of the walls thereof. The welded pipe 22 may then be fed through another swaging machine 24, after which, by any desired operation or apparatus, the continuous pipe delivered from the welding machine may be cut off into lengths of any desired dimensions.

Since the apparatus for forming the sheet into a helix enters into this invention only in so far as it is necessary to wrap the sheet or plate metal continuously into a helix, this portion of the apparatus for effecting the invention is shown entirely diagrammatically. Any apparatus, suitable for producing a helically formed sheet or strip, may be applied in carrying out this invention. In the particular construction shown on the drawings, a set of pyramid rolls 26, 28 and 30 is used to bias the metal to the proper degree in order that, after release from the rolls, the sheet or strip will assume a tubular formation, the walls of which will be formed by the helical convolutions of the metal strip. The diameter of the tube so formed will be a function of the degree of bending at rolls 26 to 30 as well as of the angle at which the sheet or strip 12 meets these rolls and the elastic factors and the thickness of the metal used.

Roll 28 is preferably retained in a suitable bearing carried by a stationary cantilever arm or stake 34, fixedly anchored upon the frame 36 of the bending apparatus. The sheet or strip is passed around the stake and either by positively driving the rolls associated with the stake or by forcing the sheet through the rolls by pressure brought to bear directly on the sheet or strip before it arrives at the pyramid rolls, the sheet is bent continuously so that after passage through the rolls it will assume the contour of the helix 14. Helix 14, continuously rotating as newly bent metal is added thereto, also moves longitudinally along the axis thereof away from the bending apparatus to the swaging machine 16, positioned closely adjacent the discharge end of the roll 28, off which the helix slides, in its longitudinal motion.

The specific construction of swaging machine 16, or even the use of a swaging machine, is not a critical requirement for the successful outcome of a process embodying the invention. To effect mechanical working of the bent metal to such extent that the formation will be rigidly maintained, even when the bent sheet is entirely free to assume any shape under the action of internal forces such as those arising from elastic stresses, is the end toward which this part of the process is directed. A swaging machine of the type hereinafter described lends itself with great efficiency and ease of control and operation to this working of the metal; at the same time, due to its basic operation, there is produced from helices, varying appreciably in their outside diameters by reason of the properties of the metals acted upon, pipe of practically accurate dimensions. The invention may also be carried out by resorting to operations wherein the helically formed sheet is worked by rolling, or the like.

The mechanical working accomplished by the swaging machine 16 is preferably a hammering operation, in which the metallic helix rotating and moving axially is attacked by a plurality of rapidly moving dies. The machine includes a base 38, from which extend the upright legs 40, at the upper end of which is carried the head 42. Base 38, legs 40 and head 42 are preferably cast as a single unit, the head being drilled or bored, as at 44, and counterbored, as at 46, to receive a tubular spindle 48. Suitable bearing bushings 50 are fitted into the bore 44 to carry the spindle rotatably. One end of the spindle is formed with an enlarged cylindrical head 52 positioned within the counterbore 46. The adjacent surfaces of head 52 and counterbore 46 are maintained out of contact by the spacing thrust washers 54, between the inner face of the head and the end of bushing 50, for well known purposes. The other end of the spindle extends from the bore 44 and has securely mounted thereon a fly-wheel 56, either directly belt driven or deriving energy from a suitable motive means through the chain belt 58, engaging a sprocket secured upon the spindle.

The cylindrical head 52 of the spindle is crossed by one or more equiangularly spaced grooves 60, which extend completely across the face of the head, intersecting centrally thereof and opening into the bore of the tubular spindle and at the sides of the head into a second counterbore 62 in head 42. Within each groove is positioned a pair of dies 64, preferably of hardened steel, the faces 66 of which, disposed adjacent the axis of the spindle, are given an accurate curvature, grading from the initial or entrance point 68 to the final or discharge point 70, to govern the working of the metal from an initially formed helix diameter to the finally delivered diameter. The dies are freely movable within the grooves 60 between the limits set by the adjacent inner surfaces 72 of associated dies and the inner faces 74 of the hammers 76. The hammers are also freely movable in grooves 60 between limits set by the dies and a number of rolls 78 carried in the counterbore 62 as hereinafter appears.

Preferably snugly but removably positioned within counterbore 62 is the hardened ring 80 within which is snugly assembled the cage 82. The cage consists of a machined annular member in the face of which are formed the cylindrical recesses 84, the diameters of which are greater than the width of the cage so that the recesses open at each edge of the annular member. Seated in each recess is one of the rolls 78, the diameters of which are greater than the width of the cage but less than that of the recess 84, so that the rolls may move transversely of the cage, being limited by the hardened ring 80, on one side, and the hammer face 86 on the other side. A cage ring 88 secured to the face of cage 82 serves to retain rolls 78 in their respective recesses, while a door 90, pivotally mounted on the front end of head 42, may be swung against the head to close the counterbore 62 and retain the respective parts therein in properly associated relation. A ring 92, secured to an end of the spindle, retains the dies and hammers in position, while a thrust ring 94, between the cage ring 88 and the ring 92, on the one hand, and the door, on the other hand, is provided for purposes well known in the arts.

The principle of operation involved in swaging machine 16 takes into account the centrifugal forces which would drive the freely moving dies and hammers away from the axis of the spindle, if the latter be rapidly rotated. This centrifugal motion is interrupted by the contact of faces 86 against the rolls 78, which are limited in their outward movement by the ring 80. The rolls climb the graduated incline of the faces as the rolls drive the hammers inwardly to project the dies, in turn, inwardly toward the helix 14. The latter is fed through the guide opening 93 in door 90, past the faces 66 of the dies and through the passage 95 formed by the central bore of the spindle. Sufficient play between rolls 78 and recesses 84 and between cage 82 and ring 80 relieves the cage of substantially all shock which is borne by the dies, hammers, rolls, and rings 80. As helices of different diameters may be fed to the machine for varying reductions, changes in hammers, dies and rolls may be effected.

The extent to which the metal is to be worked and the reduction in diameter to be attained are determined preliminary to the commencement of the operation; these ends can then be attained by properly correlating the number of blows delivered per unit to be worked and the energy of each blow. The number of rolls 78 may be varied by the insertion of new cages 82; the number of dies may be varied; the speed of rotation may be controlled. The speed of forming pipe will be a function of the forming machine factors as well as those relating to the swaging and welding speeds, all of which must be coordinated.

In the operation of swaging, the dies come into gripping contact with the helically wound metal at every blow. The rapidly rotating spindle carries the dies along at a much greater speed than that at which the helix being formed rotates, so that the dies, gripping the helical strip with tremendous pressure, due to the great kinetic energy originally imparted thereto by the rolls, will twist the helically formed strip at the point of contact with them. If the directions of rotation are properly related, the gripping action of the dies will tend to effect a movement of the adjacent edges of the helical windings into closer association and more accurate abutment so that when the helical tube has been worked and finally passes from the swaging or forging machine the adjacent edges will have become set in closely abutted relation and will so remain until welded, owing to the rigidity resulting from the work done upon the metal. The spindle and dies, for this purpose, rotate in the same direction as the helically formed strip, as indicated by the arrows 96 and 98 on the helix and the spindle, respectively. Simultaneously with the increased rotational movement of the helix at the time the dies are in gripping contact, there occurs a cessation of longitudinal movement of the helix, which will be considered in connection with the welding and final working steps.

If the inner surface of the helical strip is unsupported, at each blow of the dies the metal will be stressed in a sharp bending action so that the outer surface will be subjected to the sharp compressive stresses of the blows and the inner surface will also be affected by sharp bending stresses. In a preferred form of the apparatus, a mandrel 100 is used in connection with the dies of the swaging machine. The anvil portion 102 of the mandrel, in its construction, may follow any mechanical design most effectively tending toward the efficient feeding of the helical sheet, both rotationally and longitudinally, while providing a proper support for the deformed sheet in retaining the sheet edges in proper alignment. The mandrel will be supported within the dies and be retained in position relative to the dies by means of a link 104, which has ball and socketed joints 106 and 108 with one end of the mandrel and with the free end of the roll 28, respectively. The mandrel is thus permitted to assume any necessary position relative to the helix passing through the swaging machine and also to rotate relatively to roll 28, while, at the same time, being definitely located within the helically formed sheet at all times and being retained against longitudinal movement.

By using a mandrel, in addition to guiding the sheet edges into properly associated alignment and abutment, the amount of energy necessarily expended in fixing the edges in their relative position against their tendency to separate is appreciably reduced. In the case of a freely supported helix, work is done on the entire cross-section of the metal, as discussed in connection with the bending accomplished. However, when the mandrel is used, appreciable bending or other distortion of the sheet occurs only along the outer surface or layer since the surface of the mandrel restrains the inner surface against any such deformation. The inner surface of the helix is affected in such case only by the hammering reaction of the mandrel face, which in itself is insufficient to effect any appreciable working thereof. The outer face of the bent sheet is subjected to the direct impact of the dies. Intensive working of this surface, including a certain depth below the surface, results, so that the metal will be set to resist any tendency to move out of the formed condition.

The swaged, or otherwise worked, helix now passes to the welding apparatus 18, which may take a form similar to that of the welding torch and allied supporting and adjusting apparatus, shown in my Patent No. 1,520,271, dated December 23, 1924, these being disposed in properly assembled relation to make possible the welding of the helical seam, moving along its helical path. Apparatus 18 is preferably supported upon a standard 110, at the upper end of which is pivotally mounted the support arm 112. The direction of pivoting of arm 112 is such that the torch carrier 114 can be rocked longitudinally along the helical seam 20 in order to secure a limited adjustment of the torch 116 in controlling its position relative to the crest of the rotating pipe, as recited in my Patent 1,907,702, dated May 9, 1933.

The torch carrier 114 is pivotally mounted at the upper end of arm 112 and consists of a block 118 with which are assembled the adjusting elements described in my Patent No. 1,371,540, dated March 15, 1921. By means of this adjusting apparatus, the position of the torch laterally and vertically of the seam can be accurately governed. The torch 116 may have a tip 120 of the type set forth in my Patent No. 1,402,997, dated January 10, 1922, for effecting greater speed of welding and economy of gases necessary for the welding operation. In order to compensate for deficiency of metal at the seam, or to produce a raised reinforcement, as is well known, a wire feeding mechanism 122, deriving power from the motor 124, may be used to supply to the tip 120 a continuous weld wire 126 from the spool 128 carried by the standard on a suitable bracket arm, in the manner of my Patent No. 1,431,916, granted October 17, 1922.

The essential feature of the welding apparatus is the production of a high temperature along the margins of the helical seam so that the metal at the edges will be interfused, with or without added metal, and thereafter permitted to solidify, thus to produce a bond between the two edges which is integral therewith. Any method or apparatus which effects this result may be substituted for that described in this specification.

Since the metal, after having been worked by the forging action described, will have assumed a condition of rigidity in which the seam edges will be almost immovably positioned in contacting relation, the specific distance of the welding apparatus away from the forming apparatus is of no particular moment.

After the welding operation, the welded pipe preferably moves to the swaging machine 24, which may be of the same construction as machine 16, or any other desired device producing the same result. By this machine, the congealed metal at the seam is worked to produce a finer crystalline structure of the weld and thereby to increase the strength of the finished pipe. By proper adjustment of the dies and other effective elements of swaging machine 16 with relation to like parts of machine 24, the work of producing an accurate outside diameter pipe may be apportioned between the two machines. The step of working the welded tube may be carried out by the use of roller or like devices, or the step of working the seam metal after welding may be entirely eliminated.

Because of the gripping action of the dies of machines 16 and 24, the welding of the seam by means of apparatus 18 requires the consideration of certain factors. The helically formed sheet moves normally at a constant longitudinal speed away from the forming or bending apparatus, at at the same time rotating at substantially constant speed. When the dies are in contact with the metal, longitudinal motion at that point halts, while rotational movement is increased to that of the rapidly rotating dies. The seam edges at the welding tip are affected though to a less degree than those at the swaging machine. When the dies are released, the metal just acted upon by the dies responds to forces in the sheet tending to cause it to resume its normal position in the sheet. The metal, moving away from the bending machine at constant longitudinal speed, had placed the halted metal at the swaging machine in sharp compression and therefore the metal halted at the torch tip is now moved quickly forward. The seam edges which were rotated away from the torch tip by the dies spring back to their position under the flame. The amount of change in each of these cases is relatively slight. For example, if pipe having an outside diameter of four inches is swaged with dies revolving at 300 R. P. M., and striking twelve blows per revolution, the tubing revolving at the rate of 1 R. P. M., the swaging dies will move .0735 inch while in contact with the surface of the helix, amounting to a little more than one-sixteenth of an inch. In such a case, the helix is permitted thirteen times as much time to recover from a blow as the actual time the dies are in contact with the pipe. It can readily be seen that, since the total deviation from the fixed track of the seam does not exceed one-sixteenth of an inch, accurate heating of the seam can be maintained at all times. In longitudinal movement, the error is even smaller, as the tubing travels in such case but .00068 inch during the time of die contact. Owing to the flexibility of the yet unwelded helical tube the influence of the swaging devices at the welding region and at the place where the sheet material is delivered from the forming mill is considerably lessened.

In order further to reduce the effect of such slight deviation as does occur, the machines 16 and 24, between which the welding apparatus 18 is located, can be so arranged and the actuation of the dies so timed that the sharp movements at one swaging machine, either during the gripping period or the recovery period, will compensate for the complementary movement at the other machine, that is, by timing the dies of the two machines to contact alternately with the pipe, the recovery at one machine will to some degree compensate for the deviation at the other machine. By mounting the welding tip substantially midway between the two sets of dies, the welding point will be located centrally of the vibrating seam and at a point in a practically quiet zone of the otherwise disturbed seam.

Swaging machine 24 may have a mandrel 130 associated therewith of the same character and construction as mandrel 100, to which it is preferably anchored by means of a bar 132, having ball-and-socket connections 134 and 136 with the two mandrels.

It will be appreciated that various changes in the method and apparatus described are permissible, within the scope of the appended claims.

I claim:

1. A process of manufacturing pipe or tubing from strips, sheets or plates of elastic metal, said process comprising twisting the sheet or plate into substantially tubular shape with the edges of the metal located in proximity, subjecting the twisted metal to blows of rapidly rotating agencies to work the metal and eliminate or reduce the elastic tendency of the bent metal to return to the unformed condition and to set adjacent edges in close proximity, and then fusing the edges together.

2. In the manufacture of welded seam pipe or tubing from strips, sheets or plates of elastic metal, a process comprising twisting the strip, sheet or plate into a helix of substantially tubular shape, subjecting the twisted metal to a simultaneous rapid hammering and additional rotational action to move the side edges closely together and set them in said relation, and subsequently welding the unclosed seams of the tube closed, while the twisted metal moves freely past the welding device.

3. In the manufacture of welded seam pipe or tubing from strips, sheets or plates of elastic metal, a process comprising twisting the strip, sheet or plate into a helix of substantially tubular shape, subjecting the twisted metal to a rapid hammering action passing circumferentially around the tube for setting the edges in the twisted relation and in abutting proximity, and subsequently welding the abutted edges of the tube closed, while the twisted metal moves freely past the welding device.

4. In the manufacture of welded seam pipe or tubing from strips, sheets or plates of elastic metal; a process comprising twisting the strip, sheet or plate into tubular shape, having the side edges of said strip, sheet or plate twisted into approximate abutment; subjecting the twisted metal to a simultaneous rapid hammering and to additional movement in the direction of the original twist; and subsequently welding the abutted edges of the tube closed.

5. In the manufacture of welded seam pipe or tubing from strips, sheets or plates of elastic metal, a process comprising continuously bending a strip, sheet or plate along a line transversely thereof to form a member the walls of which consist of the helical convolutions of said bent metal, the side edges of the strip, sheet or plate being positioned in close proximity, subjecting the convolutions of said member to simultaneous rapid hammering and to circumferential movement, and subsequently welding the proximate edges of the member together.

6. In a method of manufacturing pipe or tube from sheet or plate metal, twisted into helical form to bring the side edges thereof into adjacency to form a helical seam, in which method the metal at the seam is to be interfused to produce the weld, the steps of subjecting the bent sheets or plates to a simultaneous forging action and cooperative forces acting to maintain the side edges in said positions of adjacency during the forging action so that they are set in such relation, and then subjecting the metal at the edges to the action of a metal fusing means while the edges without restraining force retain their fixed seam forming relation.

7. A process of manufacturing pipe or tubing, which comprises rotating and moving longitudinally a tubular form composed of sheet or plate metal twisted helically with the edges in proximity, progressively welding the edges by a substantially stationary agency at a region between two working zones spaced lengthwise of the tube, and at these zones subjecting the unwelded and the welded portions of the tube to rapid hammering by agencies rotating about the tube in the direction of twist, the hammering action at the two zones occurring in alternation.

8. The combination of apparatus for forming sheet or plate material by twisting it helically into tubular form and for advancing the tubular shape while turning it about its axis, a welder for progressively welding the helical seam, and means encircling the unwelded shape intermediate the forming apparatus and the welder to impart rapid hammering to the twisted sheet and additional movement in the direction of twist.

9. The combination of apparatus for forming sheet or plate material by twisting it helically into tubular form and for advancing the tubular shape while turning it about its axis, a welder for progressively welding the helical seam, a rotary swaging device through which the unwelded shape passes on its way to the welder, and a second rotary swaging device beyond the welder, both of said swaging devices being driven in the direction of twist.

10. The manufacture of welded seam pipe or tubing from strips, sheets or plates of elastic metal, that are twisted into a helix of substantially tubular shape and welded, including the steps of subjecting the twisted metal to a simultaneous forging action and cooperative forces acting to move the side edges closely together during forging action to set them in said relation, and subsequently welding the unclosed seam of the tube closed.

11. The manufacture of welded seam pipe or tubing from strips, sheets or plates of elastic metal, that are twisted into a helix of substantially tubular shape and welded, including the steps of subjecting the twisted metal to a simultaneous forging action and additional rotational action to move the side edges closely together during forging action to set them in said relation, and subsequently welding the unclosed seam of the tube closed while the twisted metal moves freely past the welding device.

12. A method of preparing sheet metal or plate for welding into pipe or tubing, including the steps of twisting the cold sheet or plate into a helix and bringing the side edges of the sheet or plate substantially into abutting proximity to form a substantially helical seam, and therafter subjecting the twisted metal while cold to a simultaneous forging action and cooperative forces acting to maintain the side edges in said abutting proximity during the forging action so that the metal is set with the seam edges in such relation for a subsequent fusion welding operation.

13. The combination of apparatus for forming sheet or plate material by twisting it helically into tubular form and for advancing the tubular shape while turning it continuously about its axis, a welder for progressively welding the helical seam, and forging means intermediate the forming apparatus and the welder for forging the tubular shape to set it, including means to insure a close relation of the seam edges during the setting of the tubular shape.

14. The combination of apparatus for forming sheet or plate material by twisting it helically into tubular form and for advancing the tubular shape while turning it continuously about its axis, a welder for progressively welding the helical seam, and forging means intermediate the forming apparatus and the welder for forging the tubular shape to set the edges in relation for welding.

JAMES L. ANDERSON.